United States Patent [19]

Regnault

[11] Patent Number: 5,055,857

[45] Date of Patent: Oct. 8, 1991

[54] DEVICE FOR RECEIVING A COMBINATION OF TWO VARIABLE VOLUME CHAMBERS AND A PLURALITY OF VALVES FOR A SUPPLY CIRCUIT OF AN INK JET PRINTING HEAD

[75] Inventor: Luc Regnault, Monteleger, France

[73] Assignee: Imaje SA, Bourg les Valence, France

[21] Appl. No.: 372,368

[22] PCT Filed: Oct. 25, 1988

[86] PCT No.: PCT/FR88/00522

§ 371 Date: Jun. 20, 1989

§ 102(e) Date: Jun. 20, 1989

[87] PCT Pub. No.: WO89/05728

PCT Pub. Date: Jun. 29, 1989

[30] Foreign Application Priority Data

Dec. 21, 1987 [FR] France .............................. 87 18127

[51] Int. Cl.[5] ...................... G01D 15/18; F04B 17/00

[52] U.S. Cl. ................................ 346/75; 346/140 R; 417/413

[58] Field of Search ............. 346/75, 140 R; 417/413

[56] References Cited

U.S. PATENT DOCUMENTS 4,357,617 11/1982 Shimazawa et al. .......... 346/140 R 4,737,802 4/1988 Mielke .......................... 346/140 R

FOREIGN PATENT DOCUMENTS 3029089 2/1981 Fed. Rep. of Germany .

56-120361 9/1981 Japan .

*Primary Examiner*—Benjamin R. Fuller

*Assistant Examiner*—Gerald E. Preston

*Attorney, Agent, or Firm*—Oblon, Spivak, McCelland, Maier & Neustadt

[57] ABSTRACT

A device is provided for receiving a combination of two variable volume chambers and a plurality of valves for forming an ink supply circuit for an ink jet printing head. Such a device is formed by a solid one-piece block comprising a plurality of cavities which are disposed radially about a central housing receiving both a piston (P) and a pressure sensor (5). The piston (P) being formed by the stacking of at least two pieces of diameter $O_1$ and $O_2$ and two membranes clamped by two flanges, the whole defining two variable volume chambers. This device cooperates with a reservoir block having two compartments between which moves a link connected on one side to an eccentric and on the other to the piston for forming an extremely reliable and compact ink supply circuit.

12 Claims, 7 Drawing Sheets

DEVICE FOR RECEIVING A COMBINATION OF TWO VARIABLE VOLUME CHAMBERS AND A PLURALITY OF VALVES FOR A SUPPLY CIRCUIT OF AN INK JET PRINTING HEAD

BACKGROUND OF THE INVENTION

1. Field of the Invention

The present invention relates to a device for receiving a combination of two variable volume chambers and a plurality of valves for forming an ink supply circuit for an ink jet printing head.

DESCRIPTION OF THE RELATED ART

In a French patent application No. 86 17385 filed on 10/12/86, completed by a Certificate of Addition application No. 87 12008 filed on 26/08/87, the Applicant described a fluid supply circuit for an ink jet printing head equipped with a multi function cell formed essentially of two chambers whose volume varies as a function of the position of a single piston coupled to the same eccentric driven by the same motor. In these two applications all the means have been described: chambers, valves, restriction, reservoir, etc. . . . required for obtaining all the functions necessary for the correct operation of the ink jet printing head.

To further improve the performances of such a combination, it is important to construct the assembly in as compact a volume as possible.

SUMMARY OF THE INVENTION

The object of the present invention is to solve this problem and relates to an arrangement of the assembly of means used in a structure easy to construct, simple and leading to a final extremely compact device.

The present invention relates more precisely to a device intended to receive two variable volume chambers and a pressure sensor cooperating with a plurality of valves and valve-restriction pairs for providing the function inherent in the correct operation of an ink supply circuit for an ink jet printing head and recovery of the unused ink in the recovery gutter; which device is characterized in that it is formed of a one piece solid block made from a material resisting chemical aggressions. in which are formed:

.on the one hand, a central cylindrical housing having two zones of diameter $\phi_1$ and $\phi_2$ in which a piston P may move formed by the stacking of two parts of diameter $O_1$ and $O_2$ defining, within these two zones by means of two sealing membranes, the two variable volume chambers;

on the other hand, a plurality of cavities for receiving the valves;

finally, a housing receiving the pressure sensor.

BRIEF DESCRIPTION OF THE DRAWINGS

The present invention will be better understood from the following explanations and the accompanying figures in which.

For the sake of clarity, the same elements bear the same references throughout the figures.

DESCRIPTION OF THE PREFERRED EMBODIMENTS

Figure 1B:
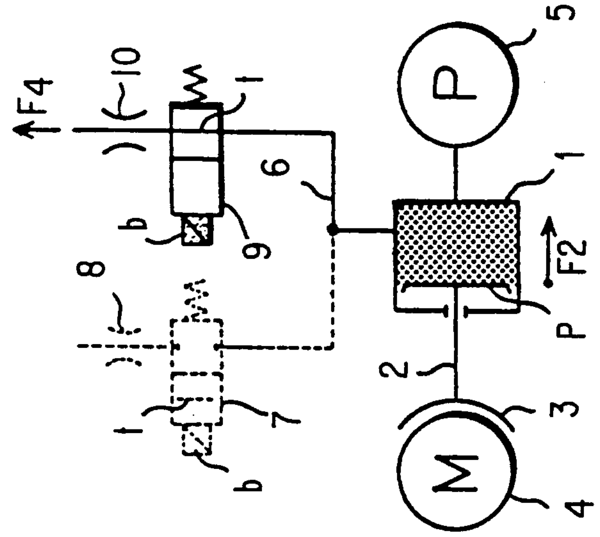
FIGS. 1*a* and 1*b* recalls the operation of a variable volume chamber such as described in the above referenced patent applications.
Figure 1A:
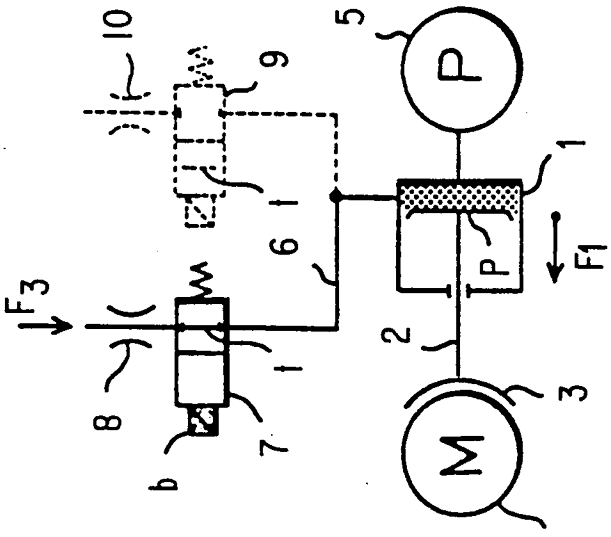

A cell such as described in the two above mentioned patent applications is illustrated in FIGS. 1*a* and 1*b*. It is essentially formed of a chamber 1 whose volume varies as a function of the movement of a piston P. The latter is connected mechanically by means 2 to an eccentric 3 driven by a stepper motor 4. This variable volume chamber 1 is connected both to a pressure sensor 5 and through a duct 6 to one, two or more valves electrically controlled by coils b. Only two valves 7 and 9 are visible in FIGS. 1*a* and 1*b*, but this number is not restrictive and the application described further on will moreover clearly indicate the use of a plurality of valves associated with a single chamber. These valves accept both directions of flow of the fluid and are normally closed in the absence of an electric signal. The position of slide t shows for example that valve 7 is in the blocking position in FIG. 1*b* and in the passing position in FIG. 1*a*, and vice versa for valve 9. Finally, in the outlet ducts of each valve a restriction 8, 10 is normally provided. These restrictions are designed so as to create a pressure difference at their ends when a flow of fluid of non zero viscosity passes therethrough, which may be translated in terms of pressure loss. They are capable more particularly of showing, in the form of a pressure difference . . . P, the viscosity of the fluid during a fluid flow pulse. These restrictions may for example be formed by a tube integrated in series in the hydraulic circuit, this tube having a length appreciably greater than the diameter of tube. By way of example, the length is equal to about 15 times the diameter of the tube through which the fluid transists. Arrows $F_3$ and $F_4$ symbolize the flow.

The generation of a fluid flow takes place in two half cycles. The first (FIG. 1*a*) consists in controlling the opening of valve 7 during the half revolution of the rotor of the motor from a position 0° to a position 180°, namely the time in which the volume of chamber 1 increases; the fluid is sucked in (arrow $F_3$). The second half cycle (FIG. 1*b*) consists in controlling the opening of valve 9 during the next half revolution of the rotor of the motor from 180° to 360°, namely when the volume of the chamber decreases; the fluid is driven back (arrow $F_4$). Under these conditions, a fluid flow may be generated in both directions by reversing the operation of valves 7 and 9, or may not be so, if one of the valves is kept open and the other closed when the motor is rotating. These three particular operating modes are essential for the application described hereafter. In addition, it is possible to add other valve-restriction pairs to the same variable volume chamber so as to create a multi-input/output pumping system, such as was described in the above mentioned parent patent and Certificate of Addition applications.

Among the other functions such a cell may play is also, for example, the emptying of a reservoir under pressure for the benefit for example of another reservoir. For that it is sufficient to open simultaneously the two valves associated respectively with these two reservoirs.

In addition, the configuration of a circuit using such a cell makes it possible to measure a pressure directly by means of a sensor 5 by placing the chamber in direct relation with the member whose pressure it is desired to measure. The valve which controls this member situated downstream is then held in the open position, the motor is stopped and the pressure sensor 5 is then in direct communication with said member via the chamber.

Figure 2:
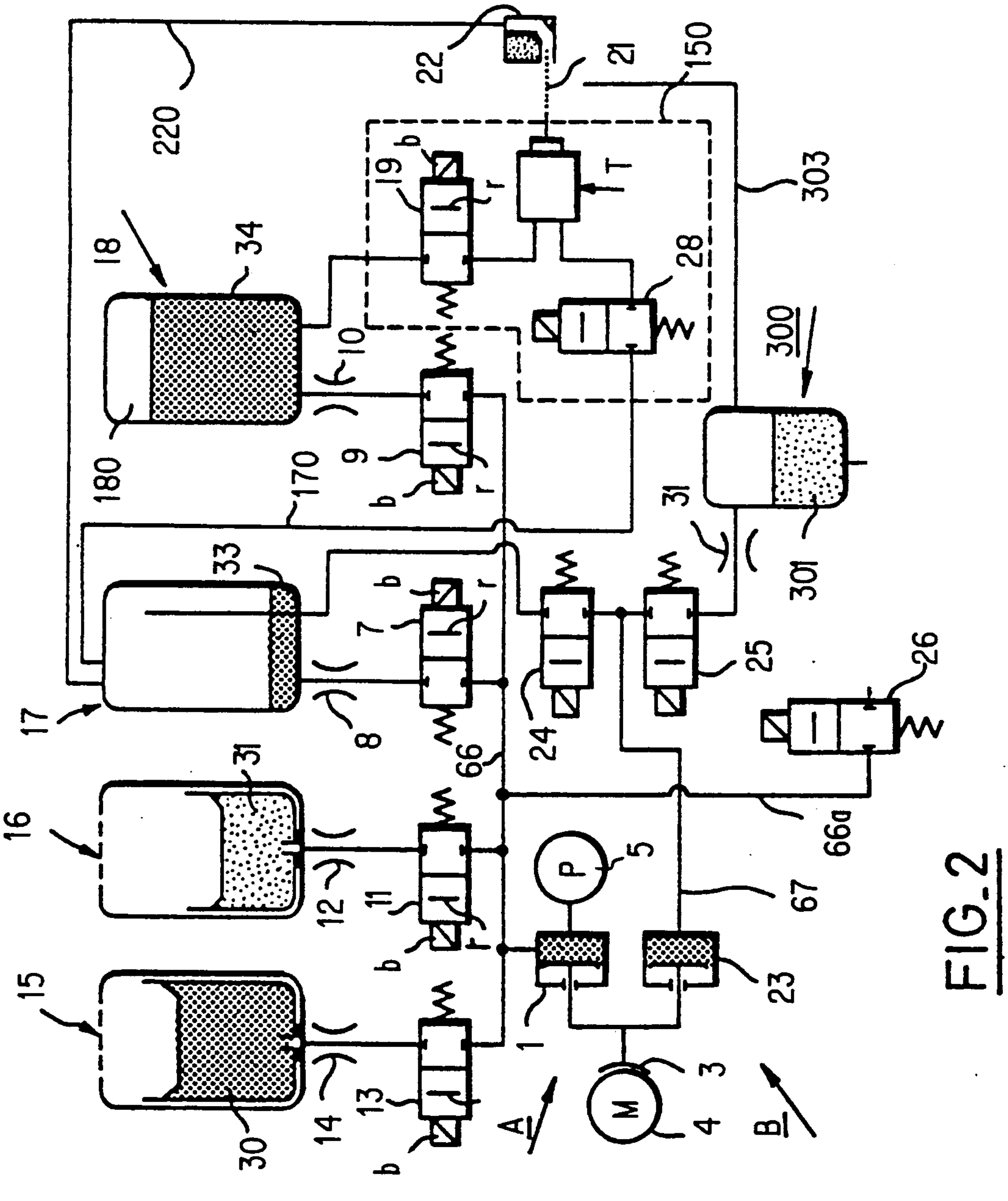
FIG. 2 illustrates schematically a variant of an ink supply circuit for an ink jet printing head intended to be integrated in a device in accordance with the present invention.

A variant of construction of such a circuit is illustrated in FIG. 2 in a static configuration, all the valves being in the closed position. This circuit comprises four reservoirs two of which are removable—reservoir 15 is a cartridge containing the reserve ink 30, not yet used, reservoir 15 is removable, reservoir 16 is a cartridge containing the pure solvent 31 for the ink used. This reserve solvent 31 is for topping up the solvent required for maintaining the viscosity of the ink used and recycled in the system. Maintenance of the viscosity of the ink of the jet is related to evaporation of the solvent during recycling of the ink. This reservoir 16 is also removable.

Reservoir 18 containing ink 34 plays the functional role of a pressure accumulator which is used for transforming the pulsed flow of the cell, when it is used as a pumping cell, into a constant flow at fixed pressure, and intended directly for the formation of the jet 21. For this, this reservoir contains a pressurized air pocket 180 which plays the role of damper. This air pocket 180 is renewed each time the printer starts up.

The purpose of reservoir 17 is to receive the recovered ink 33 and the air returning from gutter 22 and separating them. The ink required for maintaining the pressure in the accumulator 18 is taken from this reservoir.

Each of these four reservoirs 15, 16, 17, 18 is connected, through a general duct 66, to a first variable volume chamber 1 through a valve-restriction pair 9–10 for reservoir 18; 7–8 for reservoir 17; 11–12 for reservoir 16; and 13–14 for reservoir 15. This assembly, the core of which is chamber 1, bears the general reference A.

A second variable volume chamber 23 also cooperates with a plurality of valves, this combination is referenced B.

This second chamber 23 is combined with a set of two valves 24, 25. Since this chamber is coupled mechanically to the eccentric 3 common to the first chamber 1, synchronization of the valves which are associated therewith follows from the synchronism of chamber 1. Such a combination of two assemblies A and B coupled then to a single motor 4 and to a single sensor 5 contributes to the compactness of the circuit. Duct 220 connects reservoir 17, called buffer reservoir, directly to the recovery gutter 22. This reservoir 17 may be placed under a depression. A valve 26 is connected on one side to duct 66 and on the other to a condenser 300 comprising a receptacle for the condensates 301 and a discharge pipe for the volatile products.

The pressure sensor 5 is connected to this first chamber 1 and makes possible a whole range of controls and measurements. As was mentioned in the above mentioned patent applications, one of the features of this supply circuit is that it comprises only a single sensor, the pressure sensor 5, and that this single pressure sensor 5 makes possible all the measurements required for the correct operation of the assembly, namely the measurement of the pressure of the ink feeding the jet, the measurement of the viscosity of the ink, the checking of the level of reservoir 18 during regeneration of the air pocket, measurement of the empty level of reservoir 17, measurement of the low level and of the empty level of the solvent reservoir 16, measurement of the viscosity of the ink in reservoir 15, a parameter related more particularly to the temperature, measurement of the low level and of the empty level of the ink reservoir 15 and, synchronism of the operation of the valves with the position of the rotor of the motor 4. As can be seen, and as should be further emphasized, this single pressure sensor 5 alone replaces all the sensors which are necessarily met with in presently known ink supply circuits.

The functions of valves 19 and 28 are related directly to the operation of jet 21 emitted by the printing head T and form part of the prior art, particularly from the French patent application 83 16440 filed by the Applicant and published under the No. 2 553 341. For that, this combination is isolated fictitiously from the rest of the circuit by means of a broken line rectangle 150. It should be noted that valve 19 is respectively connected to the pressurized reservoir 18 and to the head T which generates the ink jet 21, valve 28 being connected to this head T and to the reservoir 17 via duct 170.

It should further be noted that, in all cases, except when mentioned, motor 4 rotates cyclically at a constant speed, which means that the two variable volume chambers 1 and 23 which are coupled mechanically each generate their volume cyclically. At each revolution this cycle of rotation presents a stop for the time required for measuring a static pressure, a pressure measurement not influenced by the differential pressures induced by flows through restrictions 8, 10, 12, 14. This time allocated allows the static pressures to be measured of the ink in cartridge 30, of the solvent in cartridge 31 and of the pressurized ink 34 in reservoir 18.

The essential operating cycles are then carried out by electrically controlling the different valves synchronously with the instantaneous position of the rotor of the motor 4, as is described in the above mentioned patent applications. Thus the following functions may be controlled:

a) maintenance of the pressure of accumulator 18 during operation of the jet;

b) measurement of the viscosity of the ink feeding the jet and adjustment of this viscosity as a function of a given reference;

c) measurement of the level of reservoir 17 and addition of ink in reservoir 18;

d) measurement of the low and empty levels of cartridges 15 and 16;

e) suction of the jet at the level of gutter 22;

f) suction of the condensate and recovery thereof in reservoir 17;

g) maintenance of the pressurized air pocket required for operation of the accumulator 18;

h) automatic short stop procedure;

i) automatic complete cleaning procedure, long shutdown or ink change.

The object of the present invention is to provide a device receiving all the previously described elements of the ink circuit intended directly to cooperate with the two chambers 1 and 23 belonging respectively to element A. called pressure pump, and to element B called depression pump.

Figure 10:
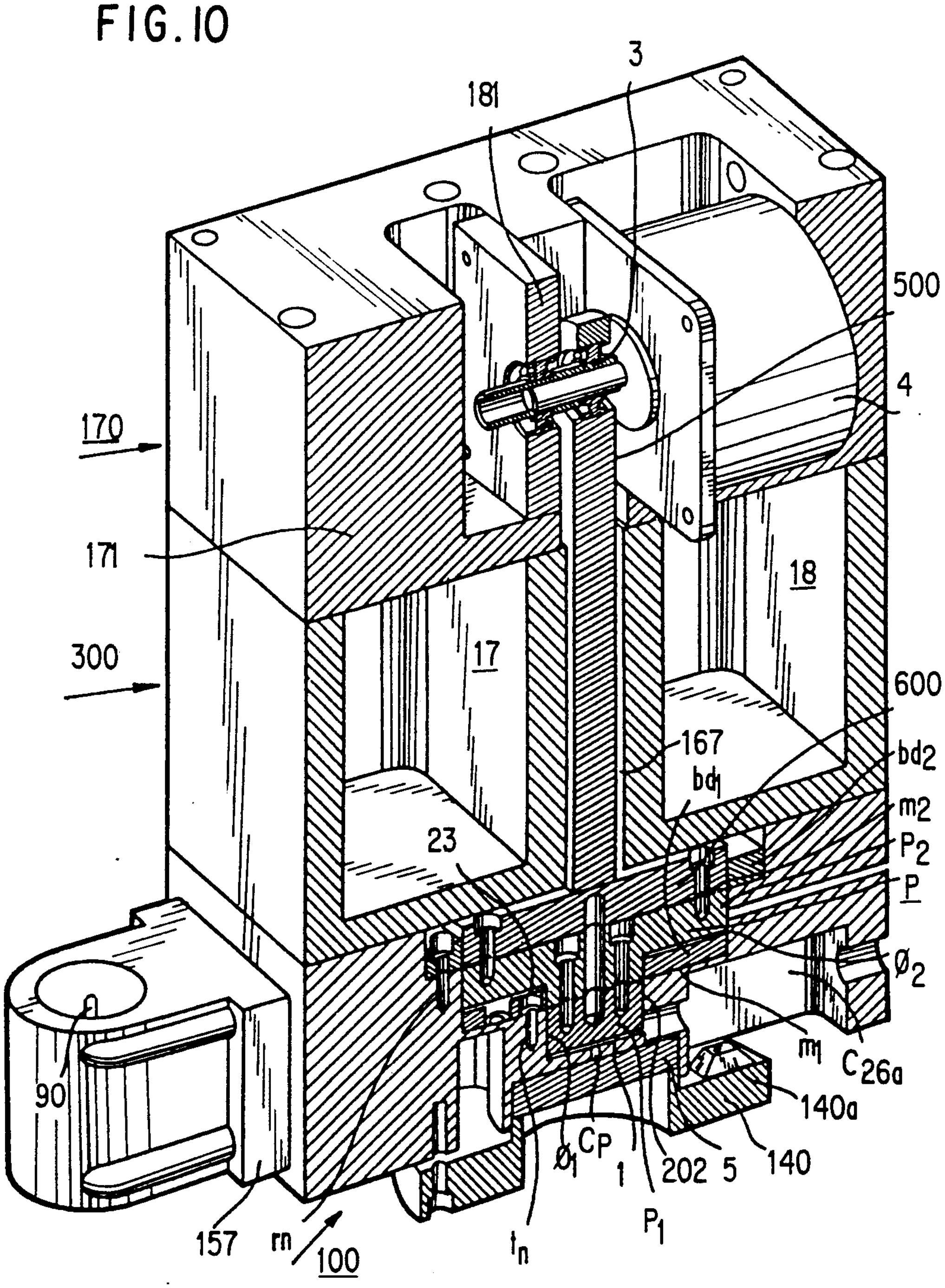
FIG. 10 is a sectional view of an assembly equipped with a device of the present invention.

According to a feature of the present invention, this device 100 is formed of a one-piece block of parallelepipedic shape made from an electrically insulating material resisting chemical aggressions, such for example as phenylene poly sulfide, called PPS. Device 100 of the present invention is illustrated in a first stage in FIGS. 3, 4 and 5 which, by certain drawing expedients, make it possible to see the housing and cavities formed inside the one-piece block by omitting the material which, in actual fact, surrounds these housings. This representation is given for the sake of clarity and for a better understanding of the present invention, without having to have recourse to too great a number of sections and cross sections which would make the description heavy and confused. It should however be noted that, when it is necessary for correct understanding, the housing or cavity shown bears the reference of the element which occupies it in actual fact: this is the case for example of piston P and its housing 202. This part 100 comprises then, formed in its mass, a plurality of housings and cavities distributed as follows:

a central cylindrical housing 202 comprising two zones of diameter $\phi_1$ and $\phi_2$ in which may move the piston P defining, in combination with two membranes shown in FIG. 10, two variable volume chambers, namely chamber 1 of diameter $\phi_1$ and chamber 23 of diameter $\phi_2$;

a plurality of so-called radial cavities, of the same shape and same inner volume, whose bases are situated in a first horizontal plane, this plurality of cavities being disposed star-wise with respect to the central cylindrical housing 202;

a cavity having substantially the same shape as the preceding ones but whose inner volume is twice that of the preceding one and is situated in a different plane. But they could be two separate cavities. These radial cavities are intended to receive one or two valves and bear the reference of the valve concerned to which the index a has been added.

Figure 3:
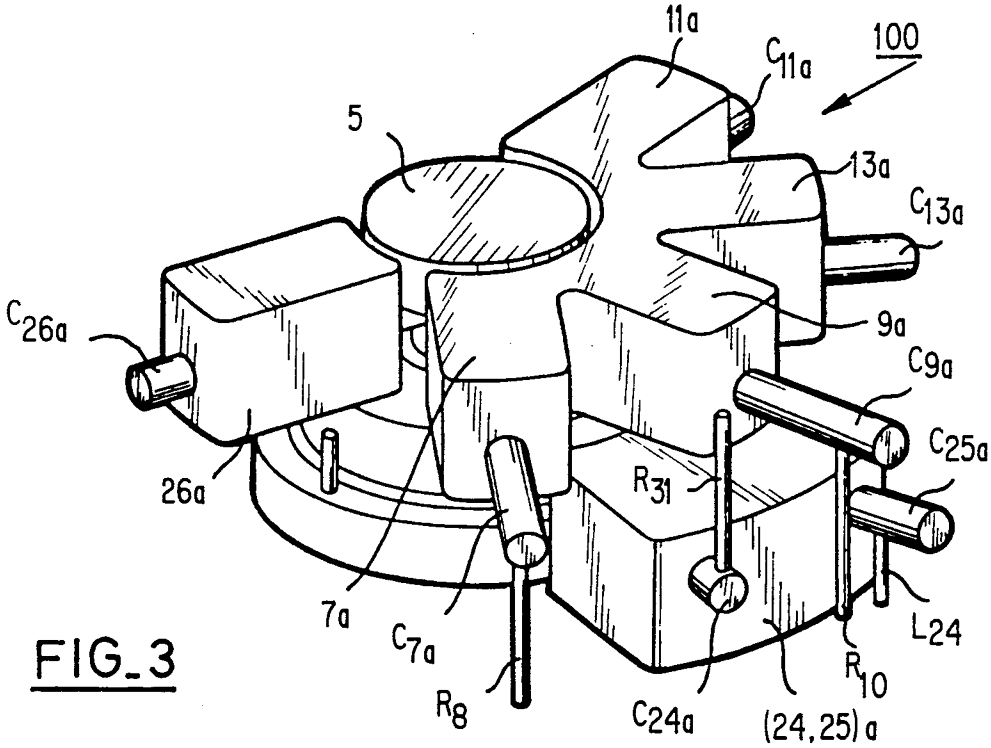
FIGS. 3, 4 and 5 illustrate the structure of the device of the present invention.

FIG. 3 shows the one-piece device 100 oriented so than the eye of the observer sees the upper plane of the housing intended to receive the pressure sensor 5 as well as, in the foreground, the assembly of the radial star cavities 11*a*, 13, 9*a*, 7*a*, 26*a* and the double cavity 24–25*a*, the central housing 202 being thus partially hidden by the assembly of these cavities.

Figure 4:
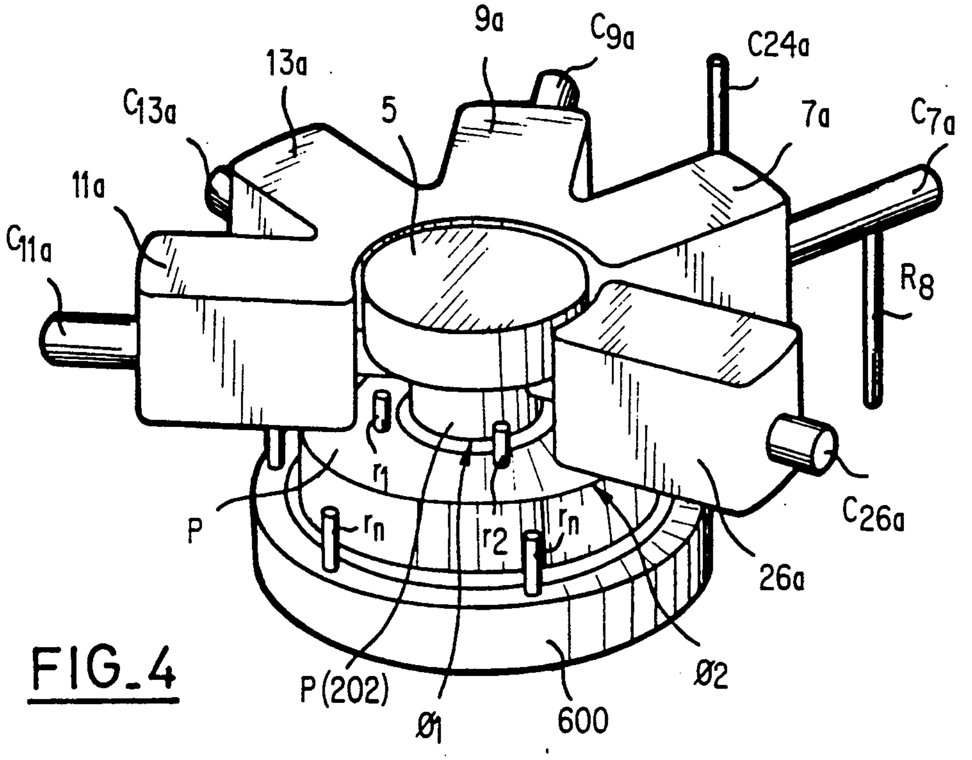

FIG. 4, on the other hand, shows this one piece device 100 oriented differently so that the eye of the observer this time sees, in the background, the assembly of the radial cavities and, in the foreground, the housing receiving the pressure sensor 5 and the base 600 carrying the piston P formed in fact by the stacking of two parts P1 and P2 (see FIG. 10).

The function of the holes t1, t2, . . . tn illustrated particularly in FIG. 4 will also be defined later. The ducts are also formed in the mass of the one-piece device 100. Their outlets, which open into the variable volume chambers, bear the index b (FIGS. 8 and 9); their opposite outlets bear the indices a such as $C_{26a}$, $C_{11a}$, $C_{13a}$, $C_{9a}$, $C_{25a}$, $C_{24a}$, $C_{7a}$.

Ducts can also be seen of a smaller diameter than that of the preceding ones, which may if required fulfil the restriction function or be simple connecting ducts between the different elements. It will be noted that all the ducts are referenced C, to which an index has been added corresponding to the valve which concerns them and the index a or b which has just been defined and that the smaller diameter ducts bear the reference L or R when it is a question of a restriction, to which reference the index has been added relating to the valve concerned. We find for example $R_8$, $R_{10}$, $L_{24}$, $L_{220}$.

Figure 5:
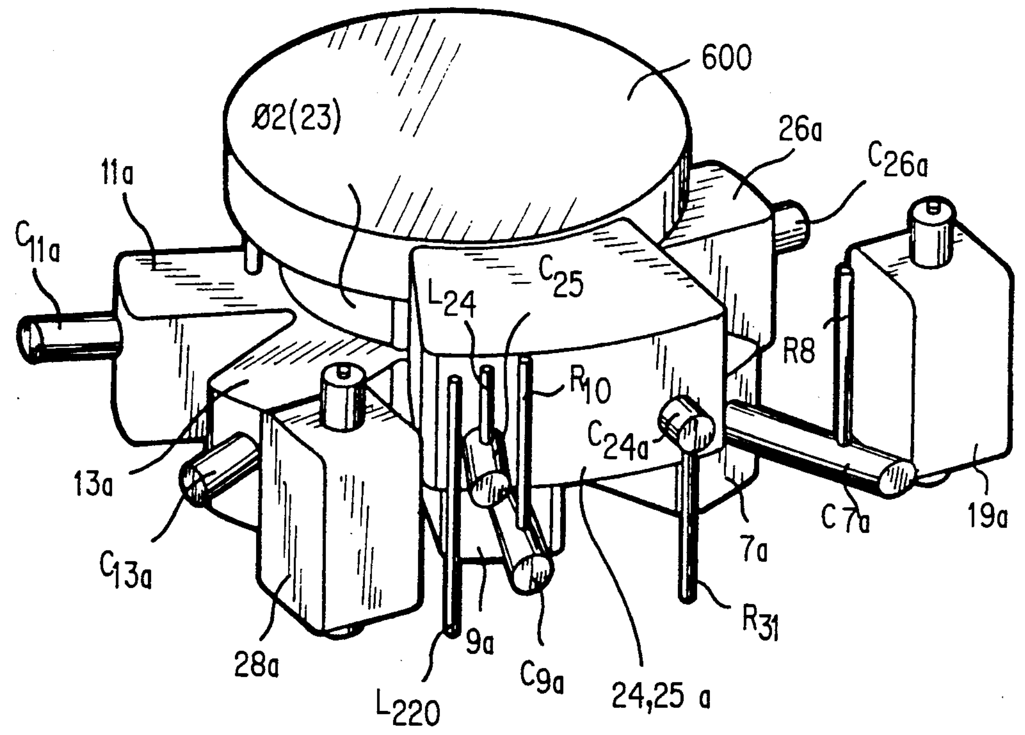

In the same spirit, FIG. 5 illustrates the one-piece device 100 already described in connection with FIGS. 3 and 4, but this time the observer sees it in a reversed position, the radial cavities are seen underneath. In this figure are shown the two additional cavities 28*a* and 28*b* which were voluntarily omitted in FIGS. 3 and 4 for the sake of clarity.

All these cavities are intended to received the valves bearing, in the circuit shown in FIG. 2, the reference corresponding to the cavity which is assigned thereto but without index a. Thus, cavity 13*a* receives the valve 13, cavity 9*a* valve 9 and so on. The same goes for the ducts and the restrictions.

Figure 6:
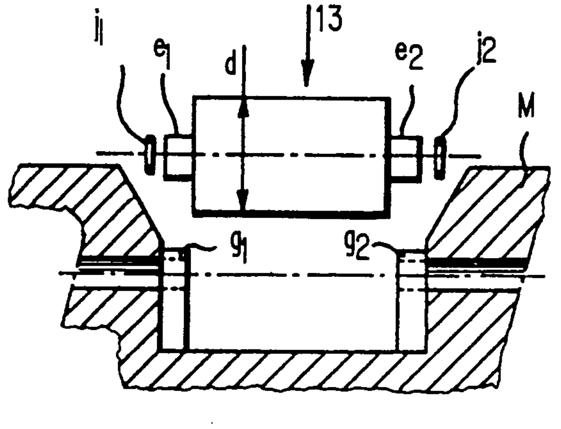
FIGS. 6 and 7 are illustrative diagrams complementary to FIGS. 2 to 5.
Figure 7:
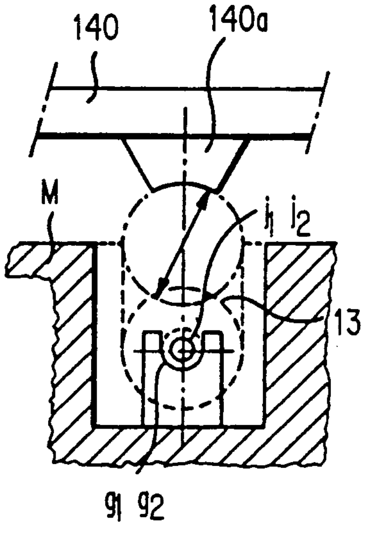

The different valves 13, 11, 7, 9, 10, 20, 24, 25, 26 are fitted into their respective cavities, e.g. and without this being limiting, in the way illustrated in FIGS. 6 and 7. By way of example, and quite arbitrarily, valve 13 of diameter d is shown in these figures. It is an electromagnetic valve of in line type both ends of which e1 and e2 are engaged in two grooves g1 and g2 provided for this purpose in the cavity. Hatching M symbolizes here the material which is absent in FIGS. 3, 4 and 5 as was mentioned before. Two O-seals j1 and j2 provide sealing. A holding system 140*a* pushes the valve concerned, valve 13 for example of diameter d, to hold it its housing. This system 140*a* may be fast with the flange 140 which holds the sensor 5 in position (FIG. 10) and thus hold the assembly of valves referenced 11, 9, 7, 26 in position.

FIG. 6 is a longitudinal section and FIG. 7 a cross section. This method of fixing the valves is not limitative. As has already been mentioned, they are in line electromagnetic valves with reversible operation.

Figure 8:
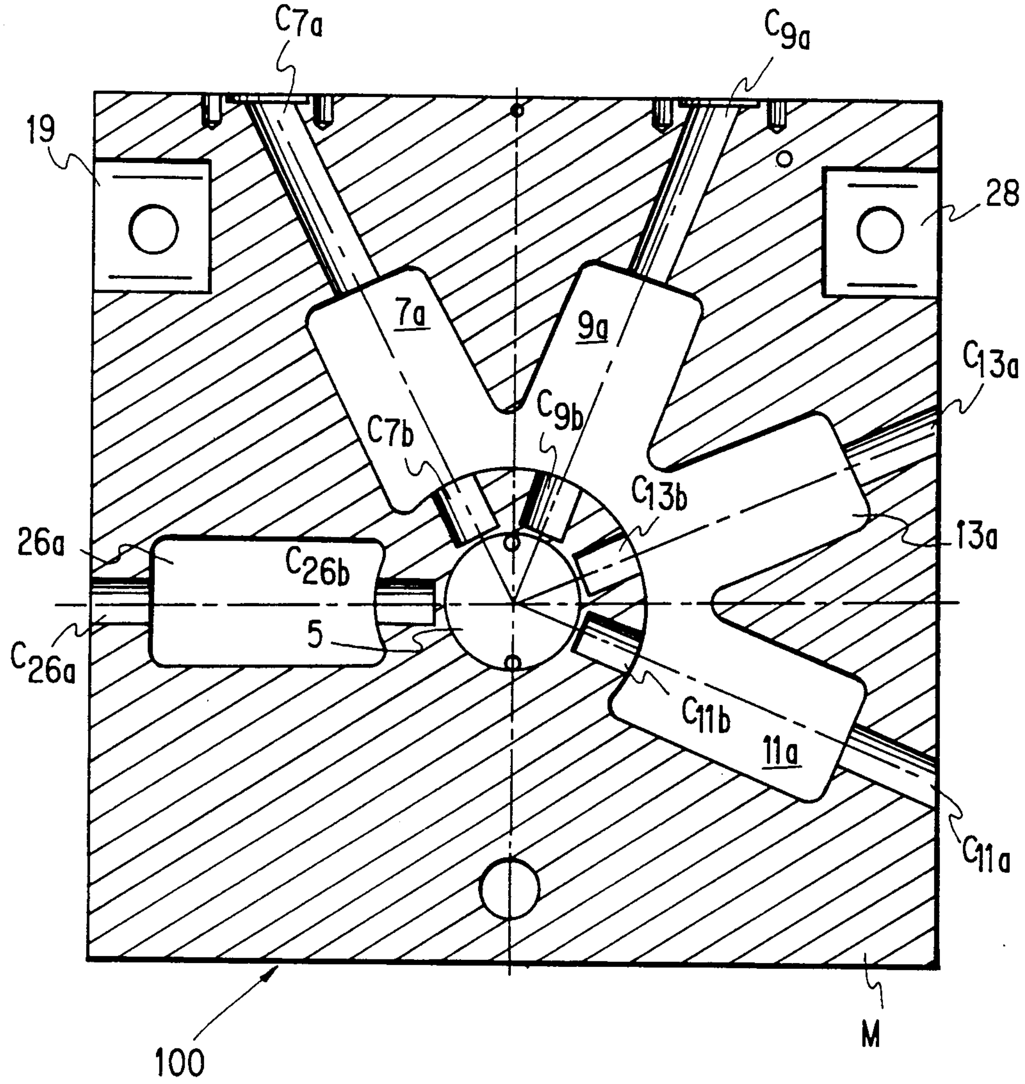
FIGS. 8 and 9 are sections through planes parallel to the base of the device, taken at two levels.

To complete the understanding, FIG. 8 illustrates a sectional view of this device 100, taken at the level of the variable volume chamber 1 (element A). This section takes into account the presence of the material M absent in the preceding FIGS. 3 to 5. It can be seen that the cross section of the device is square. We find again the cavity 26*a* with its two outlets $C_{26a}$ and $C_{26b}$, then successively the cavity 11*a* and its two outlets $C_{11a}$ and $C_{11b}$; cavity 13 and its two outlets $C_{13a}$ and $C_{13b}$; cavity 9*a* and its two outlets $C_{9a}$ and $C_{9b}$; cavity 7*a* and its two outlets $C_{7a}$ and $C_{7b}$. We also find again cavity 28*a* and cavity 19*a*.

Figure 9:
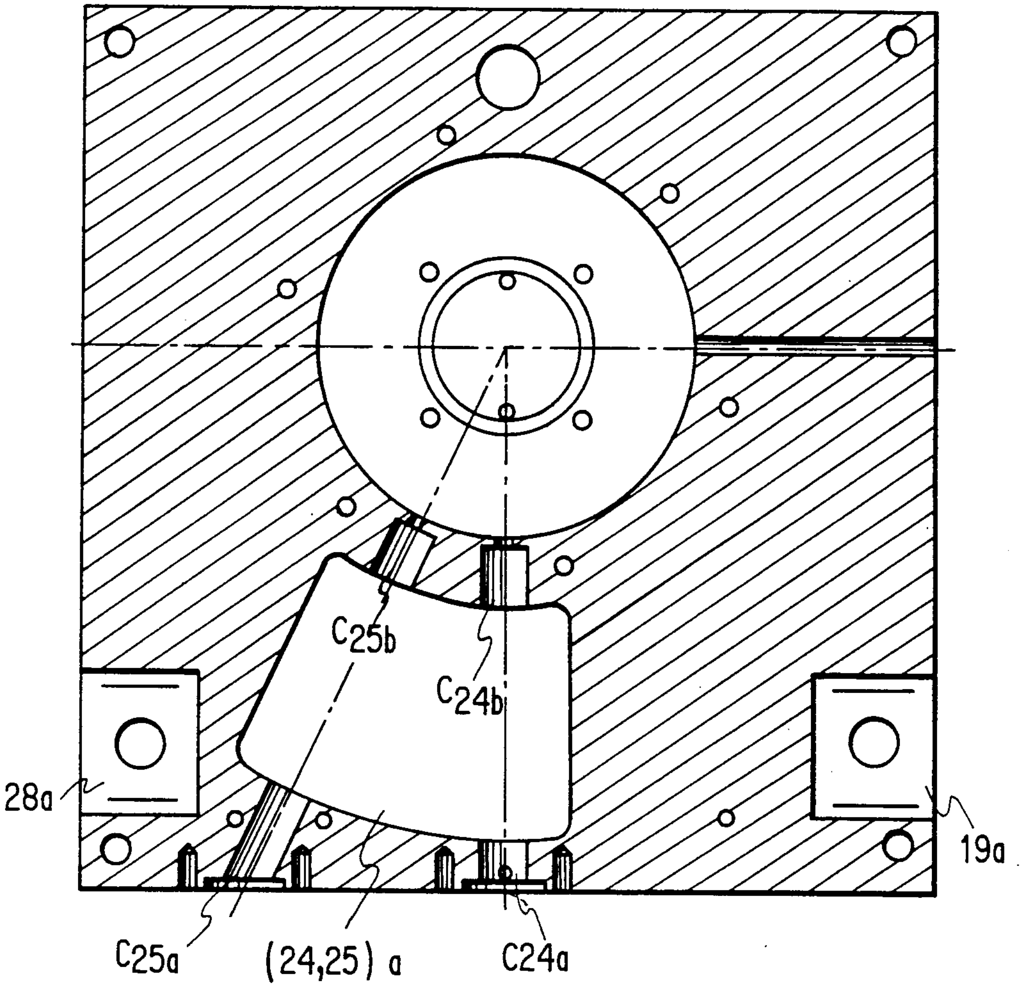

FIG. 9 illustrates a sectional view of device 100 made at the level of the variable volume chamber 23 (element B) where the double cavity $(24, 25)_a$ with its two outlets ($C_{24a}$; $C_{24b}$) and ($C_{25a}$; $C_{25b}$) as well as its two cavities 28*a* and 19*a* have been shown. All the valves and the ducts of device 100 are connected together and to different reservoirs as well as to the printing head, in an embodiment which is in no way limiting, in accordance with the diagram shown in FIG. 2.

In accordance with the present invention, such a device 100, as shown in FIG. 10 which is a sectional view, is intended to cooperate with a reservoir block 300 as will now be described. Device 100 is then formed of a solid monolithic block in which all the above described cavities are formed. A duct Cp places the pressure sensor 5 in communication with the variable volume chamber 1. A flange 140 holds this sensor 5 in position and comprises profiles 140*a* serving as supports for valves such as 26 intended to be fitted in the cavity $C_{26a}$. The piston P, as has been described above, is formed by stacking of a base 600 and two parts P2 of diameter $\phi_2$ and P1 of diameter $\phi_1$. The first part P1, through the positioning of a first sealing membrane m1 and a flange bd1, defines the variable volume chamber 1. The second part P2, through positioning of a second sealing membrane 2 and a second flange bd2 defines the variable volume chamber 23. A set of screws passing through holes t1 to tn already mentioned holds the two flanges bd1 and bd2 in position which respectively clamp the two membranes m1 and m2.

Piston P is connected through base 600 to a link 500 connected via an eccentric 3 supported by a bearing 181 to a motor 400 carried by a motor support 171. The one-piece reservoir block 300 is made, like device 100, from an insulating material resistant to chemical aggression and is fastened to this device 100 in any known way. Block 300 is disposed between the motor block 170 and device 100 and comprises two compartments which fulfil the function of reservoirs 17 and 18, and a passage 167 which link 500 passes through.

According to an important feature of the present invention, the reservoir block 300 is positioned between the motor block 170 and the device 100. This arrangement makes it possible to obtain a maximum length of link 500. Now, the greater this length, the smaller will be the angle which this link forms guided at one of its ends by the eccentric 3 and at the other by piece P1 of piston P, and the more precise will be the guiding of this piston P, the whole being maintained in an isostatic mechanical region with quite remarkable qualities of compactness. On the sides of device 100 are disposed cartridge holders 157 (a single one is visible in this figure), the second one being disposed in front of the section of FIG. 10. They are cartridge holders receiving the ink 15 and solvent 16 cartridges. According to a feature of the present invention, these cartridges are removable and the ink is taken at the level of a trocar 90 whose function is to penetrate into a membrane provided for this purpose in the cartridge, an EPT membrane pre-perforated by means of a very fine needle. Under these conditions, with penetration of the trocar 90 being made without tearing, the sealing of the cartridge is automatically provided when the user removes it.

According to another feature of the present invention, the valves are disposed in star fashion, as was seen above, at the periphery of the variable volume chambers 1 and 23. Thus, a dead volume is obtained in chamber 1 as small as possible, which leads to a high compression ratio. Though a little air remains in the chamber, it can nevertheless be pressurized.

To sum up, a device 100 in accordance with the present invention is extremely compact and comprises in its mass all the cavities and housings required for positioning all the valves and the piston defining the two variable volume chambers as well as the pressure sensor. It also comprises included in its mass the maximum of ducts opening into these chambers and to the outside. When all the valves, the piston, the cartridges and the reservoirs are in position, the circuit is ready to operate. This operation has been described in the two above mentioned patent and Certificate of Addition applications.

As has already been said, such a cell of the present invention makes it possible to provide multiple functions although its structure is extremely compact and its operation very simple. It finds applications more particularly in the field of ink jet printing, not only within the scope of industrial marking, but also in that of office automation.

I claim:

1. A device for receiving two variable volume chambers and a pressure sensor cooperating with a plurality of valves and valve-restriction pairs, said device providing for a correct operation of an ink supply circuit for an ink jet printing head and a recovery of unused ink at a level of a recovery gutter, wherein said device comprises:

a one piece solid block made from a material which resists chemical aggressions, said one piece solid block comprising a central cylindrical housing having a first zone of diameter $\phi_1$ and a second zone of diameter $\phi_2$ in which a piston may move, said piston comprising two stacked parts, the first of said two stacked parts having a diameter $O_1$ and the second of said two stacked parts having a diameter $O_2$, said two stacked parts of said piston defining, within said two zones, by means of two sealing membranes, said two variable volume chambers;

said one piece solid block further comprising:

a plurality of cavities for receiving said valves; and a housing for receiving said pressure sensor.

2. Device according to claim 1, wherein said piston comprising said two stacked parts comprise in a stacked relationship:

a base;

a first membrane clamped by means of a first flange;

a first piece of said diameter $O_2$ capable of sliding in the zone of diameter $\phi_2$ of the cylindrical housing for defining one of said two variable volume chambers;

a second membrane clamped by means of a second flange; and a second piece of diameter $O_1$ capable of sliding in the zone of diameter $\phi_1$ of the cylindrical housing for defining the other of said two variable volume chambers.

3. Device according to one of claims 1 or 2, wherein the housing for receiving the pressure sensor is contiguous with the zone $\phi_1$ of the cylindrical housing.

4. Device according to claim 3, wherein said cavities are disposed radially with respect to the axis of the piston, a first set of said cavities being disposed star-wise and having identical volumes, said first set of said cavities also having bases which are situated in the same horizontal plane, a second set of said cavities being situated in a second plane.

5. Device according to claim 4, wherein said radial cavities open into ducts placing the ends of the valves in communication either with the two variable volume chambers or with other elements of the ink circuit.

6. Device according to claim 5, wherein at least one of said ducts form restrictions.

7. Device according to claim 6, wherein said valves are in line electromagnetic valves.

8. Device according to claim 7, wherein two ends of each of the electromagnetic valves are fitted into two grooves, a sealing being provided by two seals.

9. Device according to claim 8, wherein a flange for maintaining the pressure sensor in position comprises profiles capable of holding a body of the electromagnetic valves at the bottom of the cavity of said electromagnetic valve.

10. Device according to claim 9, wherein said device serves as a base for an ink reservoir block comprising two ink reservoirs placed between said device and a motor block and comprising a passage through which a link passes, one end of said link being connected to the base of the piston and the other end of said link being connected to an eccentric driven by a motor, wherein a maximum length of the link is provided.

11. Device according to claim 10, further comprising cartridge holders for receiving an ink cartridge and a solvent cartridge.

12. Device according to claim 11, wherein said ink and solvent cartridges are removable, the ink being taken at the level of a trocar whose function is to penetrate a pre-perforated membrane.

* * * * *